(12) United States Patent
Willard

(10) Patent No.: US 6,692,061 B1
(45) Date of Patent: Feb. 17, 2004

(54) VEHICLE CONVERTIBLE ROOF

(75) Inventor: Michael Willard, Harrison Township, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/360,691

(22) Filed: Feb. 6, 2003

(51) Int. Cl.$^7$ ................................................ B60J 7/20
(52) U.S. Cl. .................. 296/116; 296/107.09; 296/109
(58) Field of Search ................................ 296/116, 117, 296/107.09, 107.01, 107.08, 109

(56) References Cited

U.S. PATENT DOCUMENTS

| | | |
|---|---|---|
| 2,704,225 A | 3/1955 | Anschuetz et al. |
| 3,235,303 A * | 2/1966 | McLeod et al. ............ 296/117 |
| 3,271,067 A | 9/1966 | Rollman |
| 5,106,145 A | 4/1992 | Corder |
| 5,118,158 A | 6/1992 | Truskolaski |
| 5,207,474 A | 5/1993 | Licher et al. |
| 6,139,087 A * | 10/2000 | Wolfmaier et al. .... 296/107.16 |
| 6,270,143 B1 | 8/2001 | Heselhaus et al. |
| 6,270,144 B1 * | 8/2001 | Schenk .................. 296/107.08 |
| 2001/0017475 A1 | 8/2001 | Busch |

* cited by examiner

Primary Examiner—Joseph D. Pape
(74) Attorney, Agent, or Firm—Harness, Dickey & Pierce, P.L.C.

(57) ABSTRACT

A vehicle convertible roof is provided which includes mechanisms to actively control at least a majority of the roof bows. The active controlling of the roof bows allows the convertible roof to have a stacked length that is reduced and results in a smaller packaging requirement. A unique and novel way to control the movement of the front roof rail relative to the center roof rail is disclosed. The simple linkage arrangement reduces the complexity of the vehicle convertible roof and provides for compact packaging of the convertible roof when in the stowed position thus reducing the packaging requirement.

44 Claims, 4 Drawing Sheets

VEHICLE CONVERTIBLE ROOF

BACKGROUND AND SUMMARY OF THE INVENTION

This invention relates generally to a convertible roof for automotive vehicles and, more particularly, to a "Z" fold convertible roof.

Soft-top convertible roofs in automotive vehicles typically employ three, four or five roof bows, each having an inverted U-shape spanning transversely across the vehicle for supporting a vinyl, canvas or polyester fabric, pliable roof cover. A number one roof bow is mounted to a pair of front roof rails and is typically latched to a stationary front header panel of the automotive vehicle body disposed above the front windshield. A number two roof bow is typically mounted to a pair of center roof rails which are pivotally connected to the front roof rails. Furthermore, the number three, four and any additional optional roof bows are commonly mounted to a pair of rear roof rails which are pivotally coupled to the center roof rails. The roof cover can also have a hard or rigid portion along with a pliable portion. For example, reference should be made to U.S. Pat. No. 5,429,409 entitled "Convertible Top" which is incorporated by reference herein. Most traditional convertible roofs are stowed in a boot well or stowage compartment that is located aft of a passenger compartment in the vehicle. A boot or tonneau cover is then used to cover the boot well and conceal the convertible roof from view and/or protect the stowed roof from the environment.

Traditional soft-top convertible roofs can present stowed packaging difficulty when it is desired to use a "Z" folding roof. Traditional "Z" folding roofs have second and subsequent roof bows that are passively controlled and rely upon the movement of the flexible cover to position the roof bows when the convertible roof is transitioned from raised and stowed positions. They also typically have three pairs of coupled roof rails. Passively controlling the second and subsequent roof bows, however, may not position the second and subsequent roof bows in a proper orientation or may require excessive stowage space. Additionally, controlling the movement of the front roof rail relative to the center roof rail often requires complex linkages to properly position the front roof rail above the center roof rail when in the stowed position. Therefore, it would be desirable to actively drive the second and subsequent roof bows to control the position of the roof bows when transitioning from raised and stowed positions. It would also be desirable to provide a "Z" folding roof that utilizes a simple and unique linkage arrangement to control movement of the front roof rail relative to the center roof rail when transitioning from raised and stowed positions.

In accordance with the present invention, a vehicle convertible roof is provided which includes mechanisms to actively control at least a majority of the roof bows. The active controlling of the roof bows allows the convertible roof to have a stacked length that is reduced and results in a smaller stowed packaging space. In another aspect of the present invention, a unique and novel way to control the movement of the front roof rail relative to the center roof rail is disclosed. The simple linkage arrangement reduces the complexity of the vehicle convertible roof and provides for compact packaging of the convertible roof when in the stowed position thus reducing the packaging requirement.

Along with actively controlling at least a majority of the roof bows and controlling movement of the front roof rail relative to the center roof rail, additional objects, advantages and features of the present invention will become apparent from the following description and dependent claims, taken in conjunction with the accompanying drawings. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
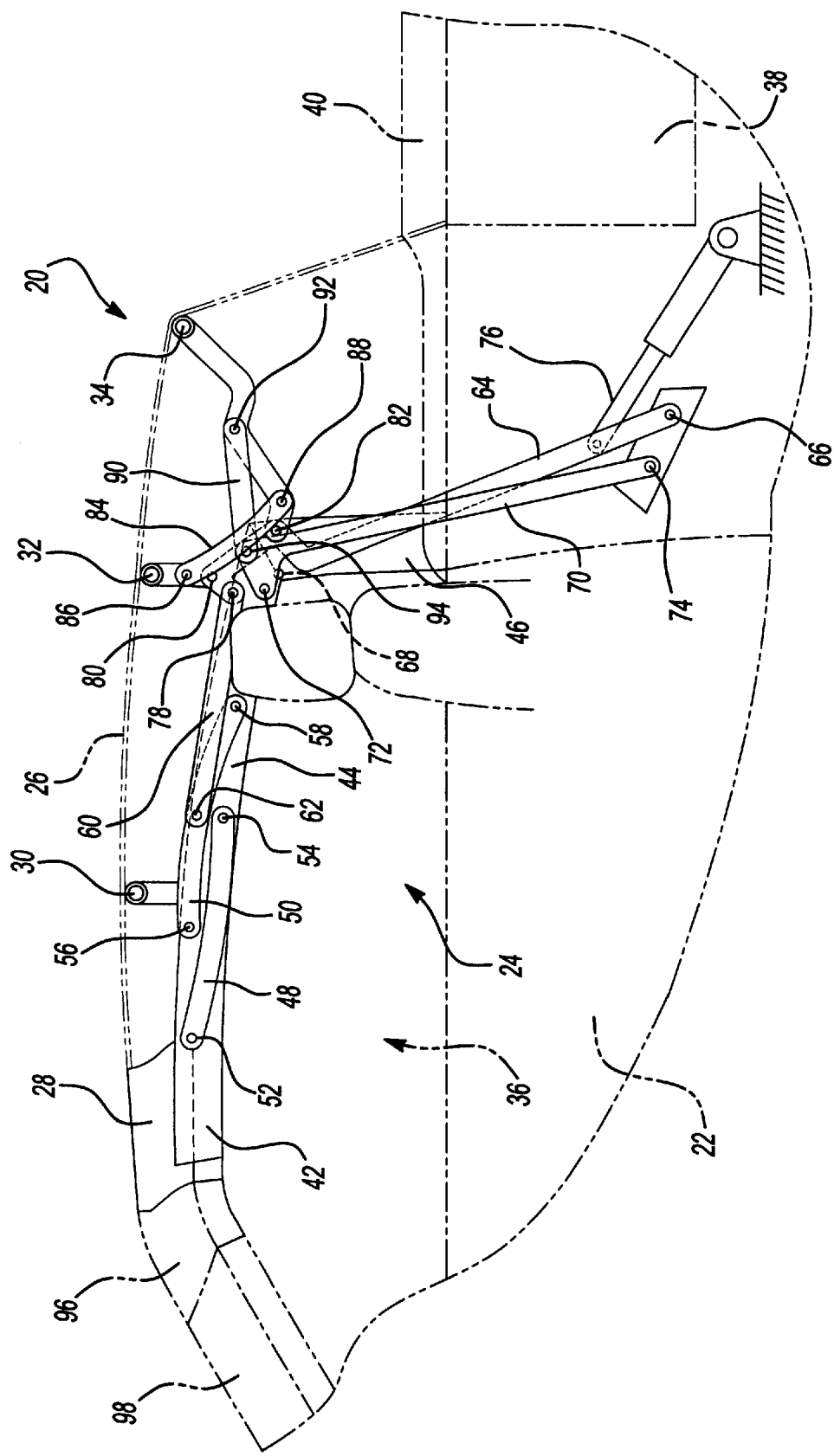
FIG. 1 is a side elevation view showing the preferred embodiment of a vehicle convertible roof of the present invention in a raised position.
Figure 2A:
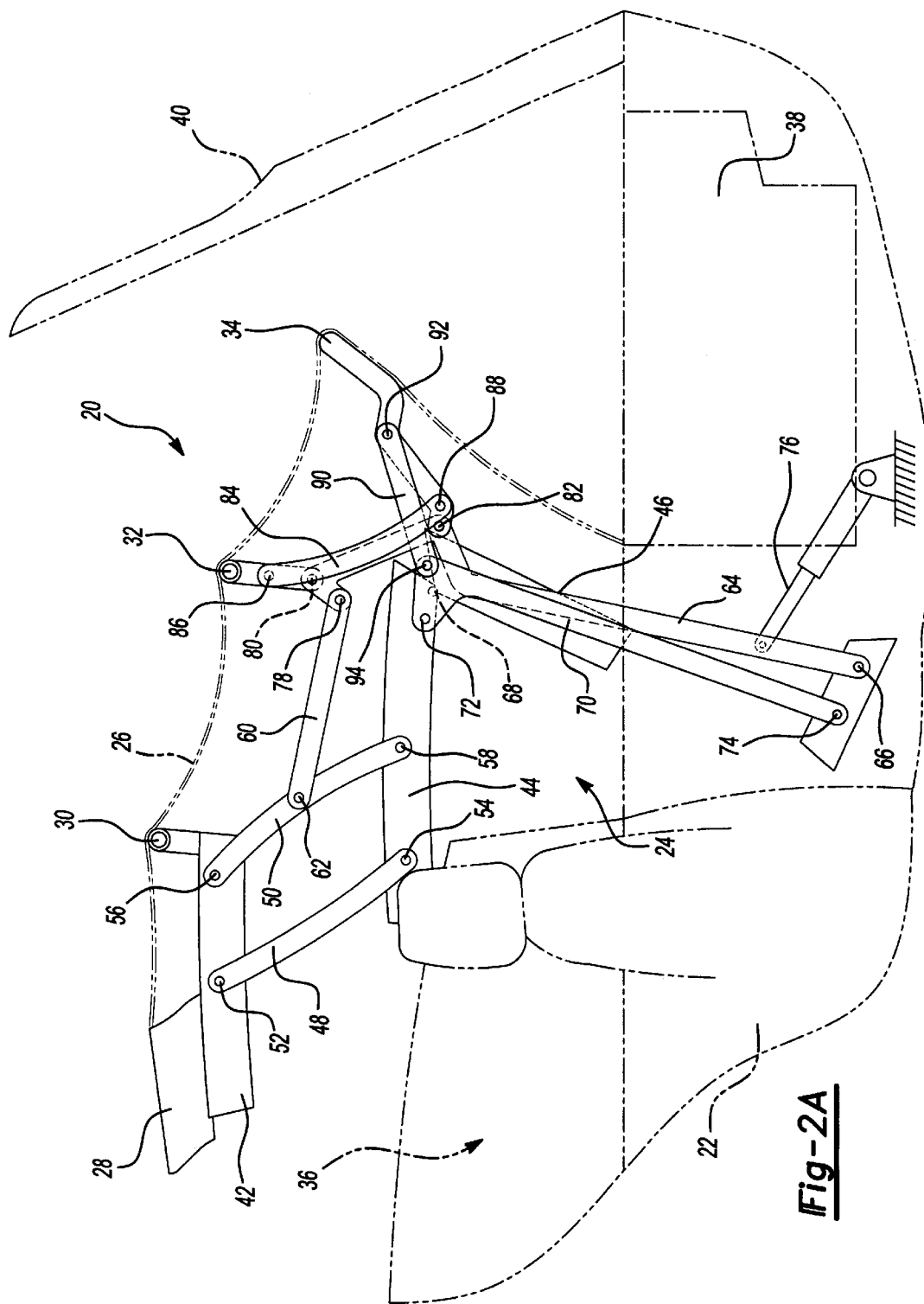
FIGS. 2A–B are side elevation views showing the preferred embodiment of the convertible roof of the present invention in different partially retracted positions.
Figure 2B:
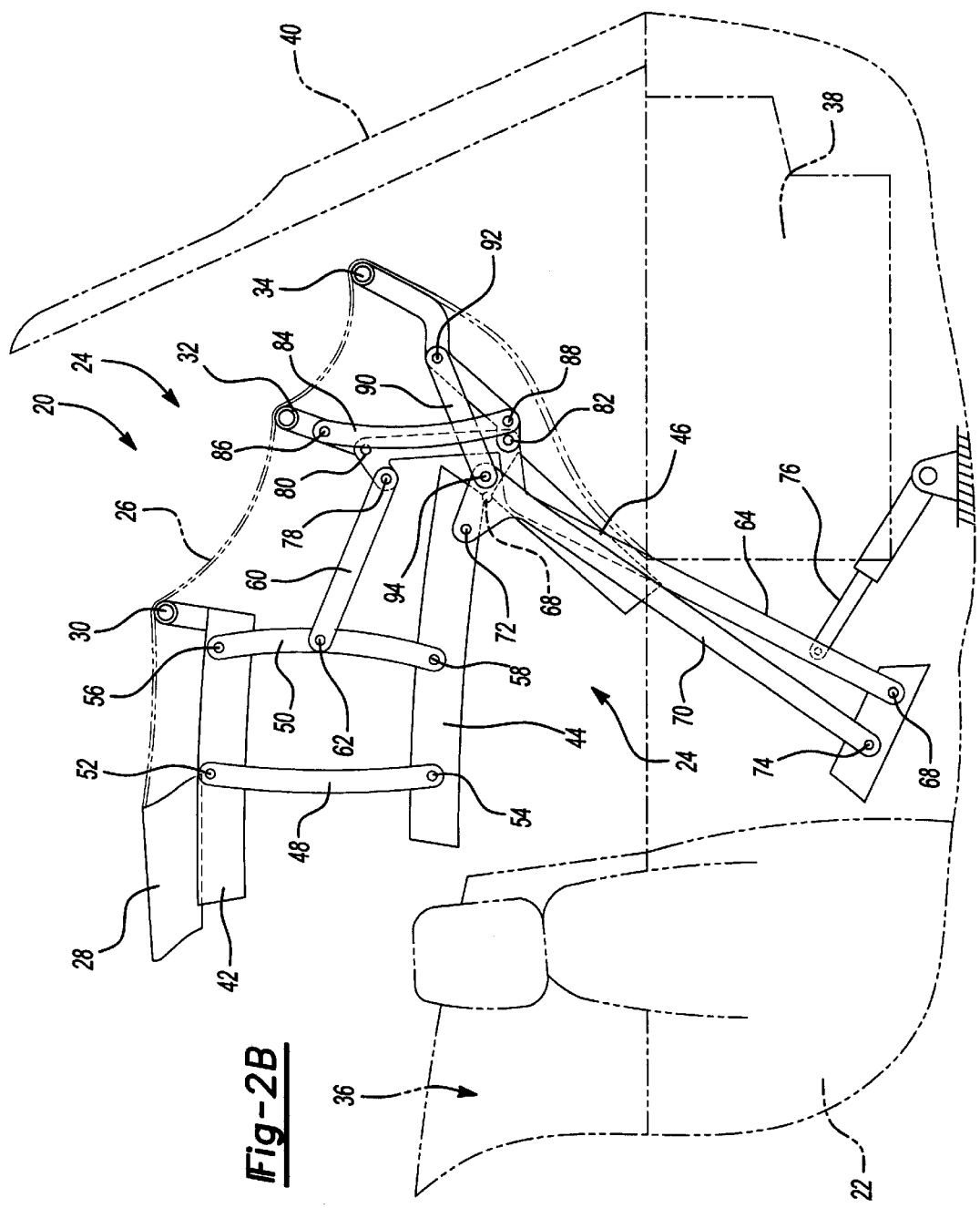
Figure 3:
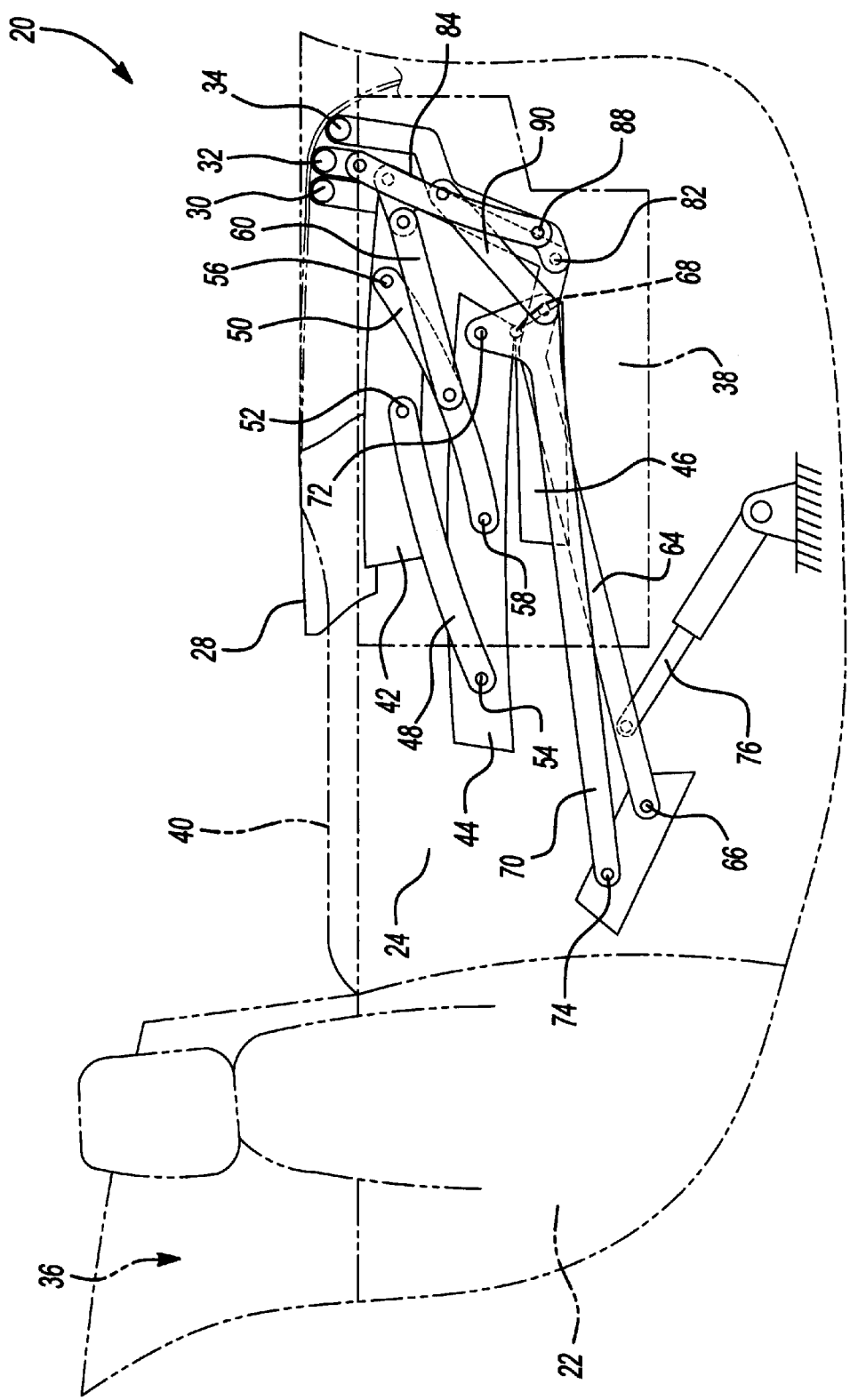
FIG. 3 is a side elevation view showing the preferred embodiment of the vehicle convertible roof of the present invention in a fully retracted or stowed position.

FIGS. 1–3 show the preferred embodiment of a vehicle convertible roof employed in a convertible roof system 20 on an automotive vehicle 22 of the present invention. Convertible roof system 20 includes a linkage assembly or top stack mechanism 24 covered by a pliable fabric roof covering 26. More specifically, top stack mechanism 24 includes a number one or forwardmost roof bow 28, a number two roof bow 30, a number three roof bow 32, and a number four or rearmost roof bow 34. Two, three and four bows 30, 32 and 34 are preferably hollow and tubular metallic members although alternate extruded, molded or stamped shapes can be employed. Convertible roof system 20 is moveable from a raised or extended position covering vehicle passenger compartment 36, as shown in FIG. 1, through intermediate positions, such as those shown in FIGS. 2A–B, to a fully retracted or stowed position within a boot or stowage area 38, as shown in FIG. 3.

Vehicle 22 has a tonneau panel mechanism that includes a tonneau panel 40 which is operable between open and closed positions to allow retraction and extension of top stack mechanism 24 to/from stowage area 38. When convertible roof system 20 is in the stowed or retracted position, tonneau panel 40 conceals at least a portion of top stack mechanism 24. The actuating mechanism for moving tonneau panel 40 between the open and closed positions can be that disclosed in U.S. Pat. No. 5,743,587 entitled "Apparatus for Use in an Automotive Vehicle having a Convertible Roof System" which issued to Alexander et al., the disclosure of which is incorporated herein by reference.

Convertible roof system 20 and top stack mechanism 24 are symmetrical about a longitudinal, fore-and-aft center line (not shown) of vehicle 22. Top stack mechanism 24 includes right and left roof linkages on the respective right and left sides of vehicle 22. For brevity, only the right side of top stack mechanism 24 is shown and discussed, however, it should be understood that left side linkages are also provided as part of top stack mechanism 24 and are substantially mirror images of the right side. When using the terms "fore" and "aft" and "front" and "back" in describing components of top stack mechanism 24, such reference refers to the orientation of the component when top stack mechanism 24 is in the fully raised or extended position. Also, when using the terms clockwise and counterclockwise in describing rotation of components of top stack mechanism 24, such reference refers to rotation relative to the view depicted in the Figures.

Referring to FIGS. 2A–B, convertible roof system 20 is shown with top stack mechanism 24 in partially retracted positions. Top stack mechanism 24, in addition to including the four roof bows 28, 30, 32 and 34, also includes a front roof rail 42, a center or intermediate roof rail 44 and a rear roof rail 46. Number one roof bow 28 and number two roof bow 30 are fixedly attached to front roof rail 42 and move with movement of front roof rail 42. Front roof rail 42 is coupled to center roof rail 44 by first and second links 48 and 50. One end of first link 48 is pivotally connected to an intermediate portion of front roof rail 42 at pivot 52 while the other end of first link 48 is pivotally connected to a front portion of center roof rail 44 at pivot 54. One end of second link 50 is pivotally connected to a rear portion of front roof rail 42 at pivot 56 while the other end of second link 50 is pivotally connected to an intermediate portion of center roof rail 44 at pivot 58. Front roof rail 42, first link 48, center roof rail 44, and second link 50 form a parallelogram four-bar linkage assembly defined by pivots 52, 54, 58 and 56 that allows front roof rail 42 to move relative to center roof rail 44. One end of a first control link 60 is pivotally attached to an intermediate portion of second link 50 at pivot 62. First control link 60 is operable to control movement of front roof rail 42 relative to center roof rail 44 when top stack mechanism 24 moves between the raised and stowed positions, as described below.

Rear roof rail 46 is fixedly attached to a drive link 64 which is pivotally attached to vehicle 22 at pivot 66. Rear roof rail 46 can be a separate. component that is fixedly attached to drive link 64 or can be integral to drive link 64 such that drive link 64 and rear roof rail 46 are a single component. A rear portion of center roof rail 44 is pivotally attached to rear roof rail 46 at pivot 68. The rear portion of center roof rail 44 is also pivotally attached to a balance link 70 at pivot 72 which is forward of pivot 68. Balance link 70 is pivotally attached to a vehicle 22 at pivot 74. Drive link 64 (and rear roof rail 46), center roof rail 44, balance link 70 and vehicle 22 form a four-bar linkage assembly defined by pivots 66, 68, 72 and 74 which controls movement of center roof rail 44 relative to rear roof rail 46 and vehicle 22. A powered actuator 76, in this case in the form of a hydraulic cylinder, is attached to vehicle 22 and drive link 64. Actuator 76 is operable to selectively cause drive link 64 to rotate about pivot 66 and cause top stack mechanism 24 to move between its raised and stowed positions, as described below. An end of first control link 60 is pivotally connected to an end of drive link 64 at pivot 78. Movement of first control link 60 is controlled by movement of drive link 64. Because, as stated above, first control link 60 controls movement of front roof rail 42 relative to center roof rail 44, drive link 64 also controls movement of front roof rail 42 relative to center roof rail 44 via first control link 60, as described in more detail below. Actuator 76 is preferably a hydraulic cylinder but can also take other forms. For example, actuator 76 can alternately be an electric motor or another suitable power transfer mechanism.

Number three roof bow 32 is pivotally connected to drive link 64 at pivot 80 which is adjacent pivot 78. Number four roof bow 34 is also pivotally connected to drive link 64 at pivot 82. One end of a second control link 84 is pivotally connected to number three roof bow 32 at pivot 86, which is adjacent pivot 80, while the other end of second control link 84 is pivotally connected to number four roof bow 34 at pivot 88 adjacent pivot 82. Second control link 84 controls rotation of number three roof bow 32 about pivot 80 when top stack mechanism 24 is moving between its raised and stowed positions, as described below. Thus, number four roof bow 34 via second control link 84 controls rotation of number three roof bow 32 about pivot 80.

One end of a third control link 90 is pivotally connected to number four roof bow 34 at pivot 92 while an opposite end of third control link 90 is pivotally connected to an end portion of balance link 70 at pivot 94. Third control link 90 controls movement and positioning of fourth roof bow 34 when top stack mechanism 24 moves between its raised and stowed positions, as described below.

In operation, convertible roof system. 20 and top stack mechanism 24 is moved from the raised position depicted in FIG. 1 through intermediate positions, such as the ones depicted in FIGS. 2A–B, to the stowed position depicted in FIG. 3 by first unlatching number one roof bow 28 from header 96 above windshield 98 on vehicle 22. An operator engages a switch (not shown) located in passenger compartment 36. The switch is connected electrically to actuator 76 to control the operation of top stack mechanism 24. When convertible roof system 20 is used in conjunction with a manually operated tonneau cover, a simple switch may be implemented without the need for sophisticated electronic controls, proximity switches and/or sensors. However, the convertible roof of the present invention may be operated in conjunction with a power operated tonneau cover as previously discussed. In this case, the switch is connected electrically to an electronic control unit (not show), such as a microprocessor, that controls the operation of top stack mechanism 24. The electronic control unit sends a signal to operate actuator 76 and to operate an actuator coupled to tonneau panel 40. Devices such a limit switches, sensors and potentiometers are coupled to the body of vehicle 22, tonneau panel 40 and convertible roof system 20 to inform the electronic control unit of the position of tonneau panel 40 and convertible roof system 20 to insure that convertible roof system 20 does not interfere with tonneau panel 40 during movement between the stowed and raised positions.

Actuator 76 is pivotally coupled to and powered to drive drive link 64 to move convertible roof system 20 between the raised and stowed position. Actuator 76 causes drive link 64 to rotate clockwise about pivot 66. As drive link 64 rotates, first control link 60 causes front roof rail 42 to move relative to roof rail 44 in an upward and rearward direction while first and second links 48 and 50 rotate clockwise about their respective pivots 54 and 58 on center roof rail 44. The rotation of drive link 64 also causes balance link 70 to rotate about pivot 74 in a clockwise direction. Rotation of drive link 64 and balance link 70 cause center roof rail 44 to rotate relative to rear roof rail 46 counterclockwise about pivot 68.

Rotation of drive link 64 and balance link 70 also cause number four roof bow 34 to be pulled forwardly by third control link 90 which causes number four roof bow 34 to rotate counterclockwise about pivot 82. The counterclockwise rotation of number four roof bow 34 about pivot 82 causes second control link 84 to push number three roof bow 32 forwardly and rotate counterclockwise about pivot 80. Actuator 76 continues to cause drive link 64 to rotate clockwise about pivot 66 until top stack mechanism 24 and convertible roof system 20 is in the stowed position and resides within stowage compartment 38, as shown in FIG. 3.

When convertible roof system 20 and top stack mechanism 24 are in the stowed position, number four roof bow 34 and number three roof bow 32 have been rotated forwardly such that number four roof bow 34, number three roof bow 32, and number two roof bow 30 are all nested together and reduce the stack length of convertible roof system 20. Additionally, front roof rail 42 is positioned above center roof rail 44 with an exterior portion of cover 28 facing upwardly.

Once in the stowed position, tonneau panel 40 can be lowered to its closed position to conceal at least a portion of top stack mechanism 24 and convertible roof system 20. Thus, convertible roof system 20 provides a convertible roof that has a reduced stack length so that the required packaging space is reduced. The convertible roof system 20 also incorporates a unique way of controlling movement of the front roof rail 42 relative to the center roof rail 44 and causes front roof rail 44 to reside above center roof rail 44 when in the stowed position.

While it is apparent that the embodiment of the invention disclosed is well calculated to provide the advantages and features above stated, it will be appreciated that the invention is susceptible to modification, variation and change without departing from the proper scope or fair meaning of the subsequent claims. For example, the convertible roof may include extra bows in the top stack mechanism. The convertible roof can also include generally rigid hardtop and soft-top combinations. Other materials and dimensions can be substituted for those disclosed. It is intended by the following claims to cover these and any other departures from the disclosed embodiments which fall within the true spirit of this invention.

What is claimed is:

1. A convertible roof system for an automotive vehicle, the system comprising:
   (a) a roof cover; and
   (b) a top stack mechanism supporting at least a portion of said cover, said mechanism being moveable between a stowed position and a raised position, said mechanism comprising:
   (i) a first roof rail;
   (ii) a second roof rail;
   (iii) at least one roof bow attached to one of said rails;
   (iv) a first link pivotally connected to said first rail and pivotally connected to said second rail;
   (v) a second link pivotally connected to said first rail and pivotally connected to said second rail;
   (vi) at least a third moveable link; and
   (vii) a control link pivotally connected to one of said first and second links and connected to said third link, said control link driving movement of said first rail relative to said second rail when said mechanism moves between said stowed and raised positions.

2. The system of claim 1, wherein said third link is a drive link pivotally coupled to a vehicle body.

3. The system of claim 2, wherein said mechanism further comprises a third roof rail and said third rail is fixed to said drive link.

4. The system of claim 3, wherein said first rail is a forwardmost roof rail, said second rail is an intermediate roof rail and said third rail is a rearmost roof rail.

5. The system of claim 2, wherein said mechanism further comprises a powered actuator, said actuator is coupled to said drive link and said actuator is operable to move said mechanism between said stowed and raised positions.

6. The system of claim 1, wherein said first link is pivotally connected to an intermediate portion of said first rail and to a front portion of said second rail, and said second link is pivotally connected to a rear portion of said first rail and to an intermediate portion of said second rail.

7. The system of claim 6, wherein said control link is fixedly pivotally connected to said second link.

8. The system of claim 7, wherein said control link is fixedly pivotally connected to an intermediate portion of said second link.

9. The system of claim 1, wherein said at least one roof bow is one of at least four roof bows, a first and second roof bow are each attached to one of said first and second rails and a third and fourth roof bow are pivotally coupled to said mechanism and are actively controlled.

10. The system of claim 9, wherein a fourth link couples said third and fourth roof bows together.

11. The system of claim 9, wherein said fourth roof bow is a rearmost roof bow and said third and fourth roof bows rotate forwardly when said mechanism moves from said raised position to said stowed position and are nested together when said mechanism is in said stowed position.

12. The system of claim 1, wherein an exterior surface of a forward portion of said roof cover faces substantially upward when said mechanism is in said stowed and raised positions and said first rail resides above said second rail when said mechanism is in said stowed position.

13. The system of claim 1, further comprising a tonneau mechanism and a tonneau cover, the tonneau over being operably moveable between open and closed positions, said tonneau cover being operable to conceal at least a portion of said top stack mechanism when said top stack mechanism is in said stowed position.

14. The system of claim 1, wherein said at least one roof bow is at least three roof bows and all of said roof bows are actively controlled.

15. The system of claim 1, wherein said pivotal connection between said control link and one of said first and second links is a fixed pivot.

16. An automotive convertible roof system comprising:
   (a) a roof cover; and
   (b) a top stack mechanism supporting at least a portion of said cover, said mechanism being moveable between a stowed position and a raised position, said mechanism comprising:
   (i) at least two roof rails pivotally coupled together;
   (ii) a first roof bow which is a forwardmost roof bow;
   (iii) a second roof bow;
   (iv) a third roof bow;
   (v) at least a fourth roof bow; and
   (vi) a control link pivotally attached to said third roof bow and pivotally attached to said fourth roof bow, said fourth roof bow driving movement of said third roof bow with said control link when said mechanism moves between said raised and stowed positions.

17. The system of claim 16, wherein said mechanism further comprises a drive link pivotally attached to a fixed location and said third and fourth roof bows are pivotally attached to said drive link.

18. The system of claim 17, wherein said mechanism further comprises:
   a balance link pivotally attached to a fixed location and pivotally coupled to at least one of said roof rails; and
   a link pivotally attached to said balance link and pivotally attached to said fourth roof bow, said link controlling positioning of said fourth roof bow when said mechanism moves between said raised and stowed positions.

19. The system of claim 17, wherein said mechanism further comprises a powered actuator and said actuator is operable to move said mechanism between said raised and stowed positions.

20. The system of claim 16, wherein said fourth roof bow rotates forwardly when said mechanism moves from said raised position to said stowed position.

21. The system of claim 20, wherein said third roof bow rotates forwardly when said mechanism moves from said raised position to said stowed position.

22. The system of claim 16, wherein said fourth roof bow is a rearmost roof bow.

23. The system of claim 16, wherein said second, third and fourth roof bows are nested together when said mechanism is in said stowed position.

24. The system of claim 16, further comprising a tonneau mechanism and a tonneau cover, the tonneau cover being operably moveable between open and closed positions, said tonneau cover being operable to conceal at least a portion of said top stack mechanism when said top stack mechanism is in said stowed position.

25. The system of claim 16, wherein each roof bow is actively controlled.

26. The system of claim 16, wherein an exterior surface of a forward portion of said cover faces substantially upward when said mechanism is in said stowed and raised positions.

27. A convertible roof system for an automotive vehicle, the system comprising:
  (a) a pliable roof cover; and
  (b) a top stack mechanism supporting at least a portion of said cover, said mechanism being operably moveable between a stowed position and a raised position, said mechanism comprising:
    (i) at least three roof rails that fold on top of one another when said mechanism moves from said raised position to said stowed position; and
    (ii) at least three roof bows, at least two of the roof bows being actively driven,
    wherein an exterior surface of a forward portion of said roof cover faces substantially upward when said mechanism is in said stowed and raised positions.

28. The system of claim 27, further comprising a rigid tonneau cover operably moveable between first and second positions, said tonneau cover covering at least a portion of said mechanism when said mechanism is in said stowed position.

29. The system of claim 27, wherein all of the roof bows are actively driven.

30. The system of claim 27, further comprising a control link directly pivotally connected to two of said roof bows and said control link drives positioning of one of said two roof bows based on movement of the other of said two roof bows.

31. A method of controlling movement of third and fourth roof bows of a convertible roof system moveable between raised and stowed positions with the third and fourth roof bows connected together by a control link comprising:
  (a) moving the convertible roof system between the raised and stowed positions; and
  (b) driving positioning of the third roof bow with the fourth roof bow via the control link while the convertible roof system is moving between the raised and stowed positions.

32. The method of claim 31, further comprising driving movement of the third and fourth roof bows with a drive link pivotally attached to the third and fourth roof bows and which drives the convertible roof system between the raised and stowed positions.

33. The method of claim 32, wherein the control link is a first control link and further comprising driving positioning of the fourth roof bow with a second control link pivotally connected to the fourth roof bow and pivotably connected to a balance link while the convertible roof system is moving between the raised and stowed positions.

34. The method of claim 31, further comprising positioning the fourth roof bow forwardly while the convertible roof system is moving from the raised position to the stowed position.

35. The method of claim 34, further comprising positioning the third roof bow forwardly while the convertible roof system is moving from the raised position to the stowed position.

36. The method of claim 31, further comprising nesting the third and forth roof bows together when the convertible roof system is in the stowed position.

37. The method of claim 31, further comprising nesting a second roof bow together with the third and fourth roof bows when the convertible roof system is in the stowed position.

38. The method of claim 31, wherein said fourth roof bow is a rearmost roof bow.

39. The method of claim 31, further comprising moving a forwardmost roof rail to a position above an intermediate roof rail while moving the convertible roof system from the raised position to the stowed position.

40. A convertible roof system for an automotive vehicle, the system comprising:
  (a) a pliable roof cover; and
  (b) a top stack mechanism supporting at least a portion of said cover, said mechanism being operably moveable between a stowed position and a raised position, said mechanism comprising:
    (i) at least three roof rails that fold on top of one another when said mechanism moves from said raised position to said stowed position, a second of said roof rails being interposed between a first and third of said roof rails when said mechanism is in said raised position, and said first roof rail moves in one of a clockwise and counter clockwise direction relative to said second roof rail and said third roof rail moves the other of said clockwise and counter clockwise direction relative to said second roof rail when said mechanism moves between said raised and stowed positions; and
    (ii) at least three roof bows, at least two of the roof bows being actively driven.

41. The system of claim 40, further comprising a rigid tonneau cover operably moveable between first and second positions, said tonneau cover covering at least a portion of said mechanism when said mechanism is in said stowed position.

42. The system of claim 40, wherein all of the roof bows are actively driven.

43. The system of claim 40, further comprising a control link directly pivotally connected to two of said roof bows and said control link drives positioning of one of said two roof bows based on movement of the other of said two roof bows.

44. The system of claim 40, wherein said first roof rail is forwardmost roof rail.

* * * * *

UNITED STATES PATENT AND TRADEMARK OFFICE
CERTIFICATE OF CORRECTION

PATENT NO. : 6,692,061 B1
DATED : February 17, 2004
INVENTOR(S) : Michael Willard It is certified that error appears in the above-identified patent and that said Letters Patent is hereby corrected as shown below:

Column 4,
Line 19, "system." should read -- system --.
Line 34, "show" should be -- shown --.
Line 38, "a" should be -- as --.

Column 6,
Line 26, "over" should be -- cover --.

Signed and Sealed this

Twenty-ninth Day of June, 2004

JON W. DUDAS
*Acting Director of the United States Patent and Trademark Office*